US012050756B1

(12) United States Patent
Portelli et al.

(10) Patent No.: US 12,050,756 B1
(45) Date of Patent: *Jul. 30, 2024

(54) MANAGING APPLICATION WINDOWS OF APPLICATIONS FROM DIFFERENT SERVERS WITHIN A SAME BROWSER WINDOW ON A USER DEVICE

(71) Applicant: PARALLELS INTERNATIONAL GmbH, Schaffhausen (CH)

(72) Inventors: Joseph Portelli, Sliema (MT); Paul Gafa, Sliema (MT); Nikolay N. Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,344

(22) Filed: May 3, 2023

Related U.S. Application Data

(63) Continuation of application No. 17/651,146, filed on Feb. 15, 2022, now Pat. No. 11,644,939, which is a continuation of application No. 17/303,518, filed on Jun. 1, 2021, now Pat. No. 11,262,884, which is a continuation of application No. 15/264,440, filed on Sep. 13, 2016, now Pat. No. 11,036,344.

(51) Int. Cl.
*G06F 3/0481* (2022.01)
*G06F 3/0489* (2022.01)
*G06F 40/14* (2020.01)
*H04L 67/01* (2022.01)
*H04L 67/02* (2022.01)

(52) U.S. Cl.
CPC .......... *G06F 3/0481* (2013.01); *G06F 3/0489* (2013.01); *G06F 40/14* (2020.01); *H04L 67/01* (2022.05); *H04L 67/02* (2013.01); *G06F 2203/04804* (2013.01)

(58) Field of Classification Search
CPC ...... G06F 3/0481; G06F 3/0489; G06F 40/14; G06F 2203/04804; H04L 67/01; H04L 67/02
See application file for complete search history.

(56) References Cited

U.S. PATENT DOCUMENTS

| | | |
|---|---|---|
| 9,225,611 B1 | 12/2015 | Bagrinovskiy et al. |
| 9,535,567 B1 | 1/2017 | Bagrinovskiy et al. |
| 2003/0124502 A1 | 7/2003 | Chou |

(Continued)

*Primary Examiner* — Angie Badawi
(74) *Attorney, Agent, or Firm* — Rosenberg, Klein & Lee

(57) ABSTRACT

A processing device sends a request from a remote access client to a first remote application server to access a first application being hosted by the first remote application server, receives instructions from the first remote application server to display a first application window within a browser window of a browser on a display of the client device, creates the first application window within the browser window based on the instructions. The processing device sends a request to a second remote application server to access a second application being hosted by the second remote application server, receives instructions from the second remote application server to display a second application window within the browser window, and creates the second application window for the second application within the browser window based on the instructions. The second application window is displayed within the browser window together with the first application window.

15 Claims, 10 Drawing Sheets

(56) References Cited

U.S. PATENT DOCUMENTS

| | | |
|---|---|---|
| 2009/0187654 A1 | 7/2009 | Raja et al. |
| 2010/0011301 A1 | 1/2010 | Binyamin |
| 2012/0066641 A1 | 3/2012 | Doherty |
| 2015/0121229 A1 | 4/2015 | Wang et al. |
| 2016/0104080 A1 | 4/2016 | Greenberg et al. |

US 12,050,756 B1

MANAGING APPLICATION WINDOWS OF APPLICATIONS FROM DIFFERENT SERVERS WITHIN A SAME BROWSER WINDOW ON A USER DEVICE

RELATED APPLICATION

This application is a continuation of U.S. patent application Ser. No. 17/651,146 filed Feb. 15, 2022; which itself claims the benefit of priority as a continuation of U.S. patent application Ser. No. 17/303,518 filed Jun. 1, 2021 which has issued as U.S. Pat. No. 11,262,884; which itself claims the benefit of priority as a continuation of U.S. patent application Ser. No. 15/264,440 filed Sep. 13, 2016 which has issued as U.S. Pat. No. 11,036,344; the entire contents of each being incorporated herein by reference.

TECHNICAL FIELD

Aspects and implementations of the present disclosure relate to application windows, and more specifically, to managing application windows of applications from different servers within a same browser window on a user device.

BACKGROUND

Traditional remote access solutions allow users to have access on their user devices to applications that are hosted by remote application servers. Typically, an application is executing on the machine of the application server, and a user device runs a remote access client to communicate with the remote application servers. The applications, which are running on the server machines, can appear to be running on the user device. For example, a user may access an email application, which is running on a server machine, using a remote access client on a user device. An application window of an application can be displayed on the screen of the user device as if the application were running locally on the user device. However, conventional solutions generally do not provide for a simultaneous presentation of application windows of applications on a screen of a user device if the applications are being hosted by different application servers.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure manage application windows of applications from different servers within a same browser window on a user device. Applications, such as email applications, word processing applications, media player applications, etc. can be hosted by different servers. The servers can be remote application servers, and the applications can be "published applications." A published application is an application that has been installed on a remote application server and can be accessed by a remote access client running on a user device (e.g., client device). Published applications execute on the computing machine of the remote application server, and to the user, the applications appear to be running locally on the user device. Conventional remote access solutions generally do not provide for a simultaneous display of application windows of applications on a screen of a user device if the applications are being hosted by different remote application servers. Aspects and implementations of the present disclosure display application windows for the applications being hosted by the different remote application servers together within the same browser window on a screen of a user device.

Aspects and implementations of the present disclosure create a secure environment for managing windows of applications from different servers by creating each application window as an isolated element within a browser window. Aspects and implementations of the present disclosure further enhance security for managing windows of applications from different servers by creating a transparent window to prevent input (e.g., mouse input, keyboard input) intended for an application being hosted by a particular server (e.g., Server-A) from being sent to another server (e.g., Server-B).

Special keyboard input, such as function key input, can be used to interact with a browser. For example, a user may press a F5 function key to refresh the browser. Special keyboard input can also be used to interact with an application other than the browser. For example, a user may press the F5 function key while using a Notepad application window to enter a timestamp in the Notepad application window. Aspects and implementations of the present disclosure place application windows within a single browser window, and can manage keyboard input to prevent any special keyboard input that is intended for an application window (and not for the browser) from being intercepted by the browser. Aspects and implementations of the present disclosure can recognize special keyboard input that is intended for an application window, and can provide the keyboard input for the intended application window to the server that is hosting the application.

Figure 1:
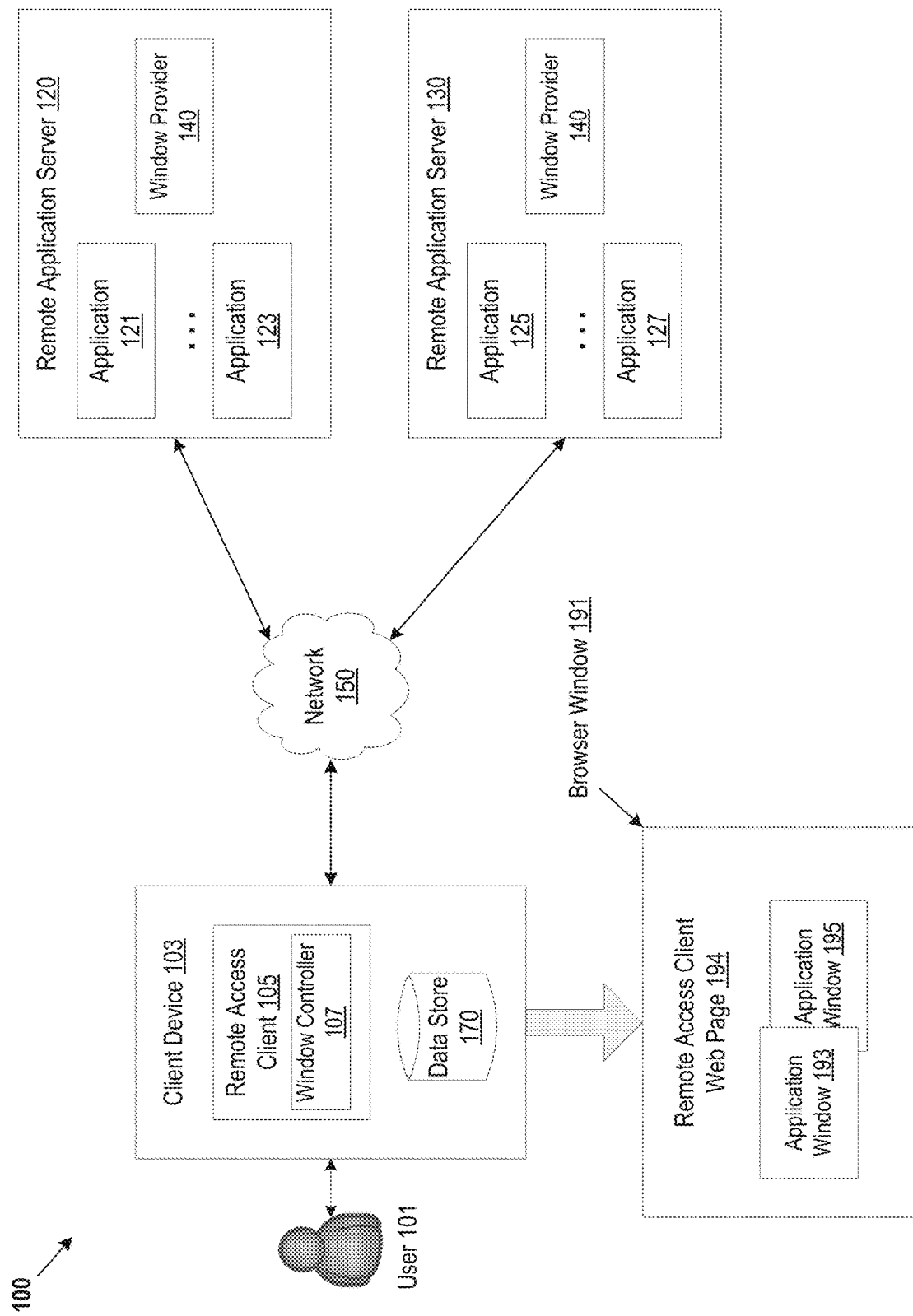
FIG. 1 is an example system architecture for managing application windows of applications from different servers within a same browser window on a user device, in accordance with various implementations of the present disclosure.

FIG. 1 is an example system architecture 100 for managing application windows of applications from different servers within a same browser window on a user device, in accordance with various implementations of the present disclosure. A user 101 can use a user device (e.g., client device 103) to access applications (e.g., applications 121-127) that are hosted by multiple servers (e.g., remote application server 120, remote application server 130) via one or more networks 150. "User" is a person or a device of a person requesting remote access to a computing system. Network 150 can be a private network (e.g., a local area network (LAN), a wide area network (WAN), intranet, or other similar private networks) or a public network (e.g., the Internet).

A user device (e.g., client device 103) can be a mobile device (e.g., tablet, smart phone), a personal digital assistant, a laptop, a desktop computer, or any other computing device. The client device 103 can include a display, and one or more input devices, such as, a pointing device, a physical keyboard, an onscreen keyboard, and/or a touch display. A pointing device can include a computer mouse, pointing stick (e.g., stylus), touch pad, and track point.

A remote application server (e.g., server 120, server 130) can be hosted on a computing machine. The computing machine can be a server computer system, a desktop computer or any other computing device. The remote application servers 120,130 can be hosted on the same computing machine or different computing machines. In one implementation, a remote application server (e.g., server 120, server 130) is executing on a virtual machine on a computing machine.

Examples of an application (e.g., applications 121-127) can include, and are not limited to, an email application, a media player, a word processing application, a calculator application, a spreadsheet application, a map application, a browser application, etc. The applications 121-127 can be installed on the remote application servers 120,130 and can be published, for example, by a user (e.g., system administrator). A published application is an application that has been installed on a remote application server (e.g., server 120, server 130) and is configured to be accessed remotely by a remote access client 105 on one or more client devices 103. Application processing on a client device 103 is kept to a minimum because a published application runs on a server (e.g., server 120, server 130) to consume server resources. There can be multiple published applications 121-127 on remote application servers (e.g., server 120, server 130). Multiple users can simultaneously access the published applications.

The client device 103 can include a remote access client 105 for accessing the published applications 121-127 being hosted by the different servers 120,130. The remote access client 105 can be a browser-based (e.g., seamless-enabled browser) client. In one implementation, the remote access client 105 is a locally-installed client. A web browser ("browser") is a software application for retrieving, presenting, and traversing information resources on the World Wide Web and to access information provided by web servers. The remote application servers 120,130 can be web application servers. An information resource can be a web page, image, video or other content. The remote access client 105 can communicate with the remote application servers (e.g., server 120, server 130) to have the published applications 121-127 appear to be running on the client device 103 of the user 101.

Aspects of the present disclosure provide a service that allows applications (e.g., applications 121-127) from different servers 120,130 to be displayed in and managed using a single browser window 191 of the remote access client 105 on the client device 103. The service includes a server-side window provider 140 on each server (e.g., server 120, server 103) and a client-side window controller 107 on the remote access client 105. The service can group application windows 193,195 of applications 121,125 being hosted by different servers 120,130 together in a single browser window 191 to be displayed to a user 101 as if the application windows 193,195 for the applications 121,125 were hosted by the same server.

The remote application servers (e.g., server 120, server 130) can include a window provider 140 to provide instructions to the remote access client 105 on the client device 103 for presenting application windows of applications that are from different remote application servers within a single browser window 191 on the client device 103. The remote access client 105 can include a window controller 107 to receive the instructions from the window providers 140 and to display the application windows (e.g., window 193, window 195) of applications (e.g., application 121, application 123) from different remote application servers (e.g., server 120, server 130) within a single browser window 191 on the client device 103.

A browser can have one or more windows (e.g., browser window 191) on the client device 103. A window is a graphical control element, and consists of a visual area containing the graphical user interface of the program (e.g., browser) it belongs to and can be framed by a window decoration. A window can be a rectangular shape that can overlap with the area of other windows. A window can be resized, moved, hidden, restored or closed. Windows can include graphical objects, such as, a menu-bar, toolbars, controls, icons and a working area. In the working area, the document (e.g., web page), image, folder contents or other object is displayed. For example, the working area of browser window 191 can display the remote access client web page 194 for the remote access client 105.

The remote access client web page 194 can display representations (e.g., icons) of published applications 121-127 that are available for the user 101 to access remotely via the client device 103. The user 101 can be an authenticated user. A remote access client web page is described in greater detail below in conjunction with FIG. 2. The user 101 may choose to access application 121 and application 125 by selecting the corresponding icons on the remote access client web page 194.

To enable user access to application 121, the window controller 107 can send a request to the remote application server 120 for access to application 121. The remote application server 120 can start application 121 and display an application window for application 121 on a display of the remote application server 120. The window provider 140 of the remote application server 120 can send instructions to the window controller 107 for displaying application window 193 for application 121 within the browser window 191 on the client device 103. The instructions can be based on the presentation of the application window on the display of the remote application server 120, as described in greater detail below in conjunction with FIG. 2.

To enable user access to application 125, the window controller 107 can send a request to the remote application server 130 for access to application 125. The remote application server 130 can start application 125 and display an application window for application 125 on a display of the remote application server 130. The window provider 140 of the remote application server 130 can send instructions to the window controller 107 for displaying application window 195 for application 125 within the same browser window 191 on the client device 103. The instructions can be based on the presentation of the application window on the display of the remote application server 130, as described in greater detail below in conjunction with FIG. 3. Creating application windows for applications from different servers within the same browser window on a client device is described in greater detail below in conjunction with FIG. 3, FIG. 5, and FIG. 6.

When a published application (e.g., application 121, application 125) is launched, a session is created between the remote access client 105 and the corresponding remote application server (e.g., server 120, server 130). For example, there can be a session between the remote access client 105 and the remote application server 120 when application 121 is started on the remote application server 120. There can be a session between the remote access client 105 and remote application server 130 when application 125 is started on the remote application server 130. The sessions can be remote desktop protocol (RDP) sessions. There can be one RDP session between the remote access client 105 and each remote application server (e.g., server 120, server 130). A single RDP session for a particular server can be used by the remote access client 105 for accessing multiple applications being hosted by the particular server. In one implementation, when an application is defined, for example, by an administrator, as an isolated application, the remote access client 105 can have a separate RDP session for each isolated application.

The window controller 107 can create an HTML Inline Frame (<iframe>) element for each RDP session in the code (e.g., hypertext markup language (HTML)) of the document (e.g., remote access client web page 194) in the browser window 191. The browser can include one or more (<iframe>) elements to create a nested browsing context. The browser can be a seamless-enabled browser. An example of a seamless-enabled browser is an HTML5 browser. An <iframe> element in a seamless-enabled browser has a "seamless" attribute to remove borders and scrollbars from the <iframe>. The seamless attribute is a Boolean attribute. When enabled, the seamless attribute specifies that the contents of an <iframe> should appear to a user 101 to be integrated with and a part of a web page (e.g., remote access client web page 194), and not separate from or independent of the web page (e.g., remote access client web page 194).

The window controller 107 can receive instructions for creating application windows 193,195 from the corresponding servers 120,130, and can update the Document Object Model (DOM) of the document (e.g., remote access client web page 194) in the browser window 191 based on the instructions, which can automatically cause the browser to display application windows 193,195. When a web page (e.g., remote access client web page 194) is loaded, the browser creates a DOM of the page. The DOM is a cross-platform and language-independent application programing interface that treats an HTML XHTML, or XML document as a tree structure wherein each node is an object representing a part of the document. The objects can be manipulated programmatically by updating the DOM, and any visible changes occurring as a result can then be reflected in the display of the document. The DOM for a document (e.g., web page) permits programs and scripts to dynamically access and update the content, structure and style of XML or HTML documents. The DOM is composed of a set of objects/elements, a structure of how the objects/elements can be combined, and an interface to access and modify the objects and/or elements.

In some implementations, the window controller 107 can create a window for an application in the browser window 191 by adding a <div> element for the application window to the code of the remote access client web page 194. There can be multiple <div> elements to represent multiple application windows (e.g., window 193, window 195). A <div> element is a container unit that encapsulates web page elements and divides an HTML document (e.g., remote access client web page 194) into sections. A <div> element can be used to group together HTML elements and to configure the grouped elements at once. The HTML code for the remote access client web page 194 can include multiple <div> elements for application windows 193,195. The window controller 107 can assign style properties and values for the properties to each <div> element to specify a position of a respective application window, dimensions of the respective application window, background color of the respective application window, etc.

The window controller 107 can define the content to populate an application window (e.g., window 193, window 195) by placing a <canvas> element for the content within a <div> element of the application window. The window controller 107 can copy portion(s) of the content of the hidden <iframe> to the <canvas> element of the visible application window. The browser can include one or more HTML canvas (i.e., <canvas>) elements. The <canvas> element can be used to draw graphics on the remote access client web page 194. The graphics can be for a graphical user interface (GUI) of an application (e.g., GUI for application 121, GUI of application 125). In one implementation, by default, a canvas has no border and no content. The HTML <canvas> element can be used as a container for graphics, and the graphics can be created, on the fly, via scripting (e.g., JavaScript). The <canvas> element can have an identifier attribute, which can be referred to in a script that defines the content of the <canvas> element. The <canvas> element can have a width attribute and a height attribute to define the size of the canvas. For example, application 121 may be a Calculator application, and application 125 may be a Notepad application. The window controller 107 can create application window 193 for the Calculator application by adding a <div> element to the code of the remote access client web page 194, and can specify that the content of the application window 193 is the GUI of the Calculator application by adding a <canvas> element to the <div> element for application window 193. The window controller 107 can receive instructions for creating application window 193 from the server 120 that includes a script for creating the GUI in the <canvas> element for the application window 193 for the Calculator application. The window controller 107 can execute the script. The window controller 107 can create application window 195 for the Notepad application by adding a <div> element to the code of the remote access client web page 194, and can specify that the content of the application window 195 is the GUI of the Notepad application by adding a <canvas> element to the <div> element for application window 195.

The window controller 107 can assign attributes and values for the attributes to a <canvas> element to specify the dimensions of the respective application window, seamlessness of the respective application window, etc.

By using a <canvas> element within a <div> element, the window controller 107 can include an application window (e.g., window 193, window 195) for an application (e.g., application 121, application 125) as part of the remote access client web page 194 rendered in the browser window 191. Creating an application window within a browser window using a <canvas> element in a <div> element is described in greater detail below in conjunction with FIG. 5.

A user 101 can interact with the application windows 193,195 on the client device 103 via one or more input devices (e.g., pointing device, keyboard, and touch screen) to perform one or more operations (e.g. resize, move, close, restore) on the application windows 193,195. A computer mouse ("mouse") is used as an example of a pointing device throughout this document. For example, the user 101 may use a mouse to resize application window 193 within the browser window 191.

The window controller 107 can capture mouse input and/or keyboard input for an application window (e.g., window 193, window 195) in the browser window 191, and can send a request to the remote application server (e.g., server 120, server 130), which is hosting the application that corresponds to the captured input, to perform the operations (e.g. resize, move, close, restore) on an application window displayed on the server. The request can include the captured mouse input and/or keyboard input.

The window controller 107 can determine, from mapping data that is stored in a data store 170 on the client device 103, which remote application server is hosting the application that corresponds to the captured input. The window controller 107 can create mapping data that associates application windows, which are created within the browser window 191 on the client device 103, to corresponding servers (e.g., server 120, server 130) and corresponding sessions (e.g., RDP sessions). The mapping data can include an entry for each application window (e.g., window 193, window 195) within the browser window 191. An entry can include the window identifier for the application window, and a corresponding server and corresponding session for the application window. The window controller 107 can use the mapping data to forward input for mouse events and keyboard events, which are detected by the window controller 107, to an appropriate server (e.g., server 120, server 130) for an appropriate session (e.g., RDP session), as described in greater detail below in conjunction with FIGS. 7-9.

A data store 170 can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

The window provider 140 on a server (e.g., server 120, server 130) can receive request(s) from the window controller 107 to perform one or more operations (e.g. resize, move, close, restore) on an application window on the server. The server can perform the operation on the local application window and send instructions (e.g., display commands) to the window controller 107 for performing the operation on a corresponding application window within the browser window 191. Sending instructions by a remote access server to a remote access client for displaying an application window within a browser window is described in greater detail below in conjunction with FIG. 4.

The window controller 107 can receive the instructions for performing the operation(s), update the DOM of the remote access client web page 194 based on the instructions, which causes changes (e.g., create application window, move application window, resize application window, close application window, restore application window) to be reflected immediately in the client web page 194 without refreshing the client web page 194, as described in greater detail below in conjunction with FIG. 5 and FIG. 7.

The window providers 140 in the different remote application servers 120,130 and window controller 107 in the remote access client 105 can exchange data to transfer screen updates, keyboard input, and mouse input for creating, displaying, and/or changing application windows within the same browser window 191 using a remote display protocol (e.g., Remote Desktop Protocol (RDP)).

Mouse events can occur quickly for a particular application window (e.g., window 193, window 195), and some mouse events may not be received by the intended remote application server (e.g., server 120, 130). For example, when sudden mouse movements occur while dragging application window 193, the mouse may move outside of the application window 193. For example, the user 101 may very quickly use a mouse to drag window 193, which corresponds to server 120, and the mouse may inadvertently be placed on top of window 195, which corresponds to server 130. Aspects of the present disclosure prevent input (e.g., mouse input, keyboard input) from mistakenly being sent to an unintended server by creating a transparent window to capture input, as described in greater detail below in conjunction with FIG. 8. Aspects of the present disclosure avoid potential network 150 latency issues between the window controller 107 on the remote access client 105 and the window providers 140 on remote application servers 120, 130 that may be caused by quick mouse movements by using a transparent window.

There may be special keyboard input, such as the user 101 pressing a function (e.g., F5) key, which is intended to be applied to an application window (e.g., window 193,195) for a particular application (e.g., server 120, server 130). Aspects and implementations of the present disclosure prevent a browser from intercepting the special particular keyboard input and direct the special keyboard input to an intended server, as described in greater detail below in conjunction with FIG. 9.

Figure 2:
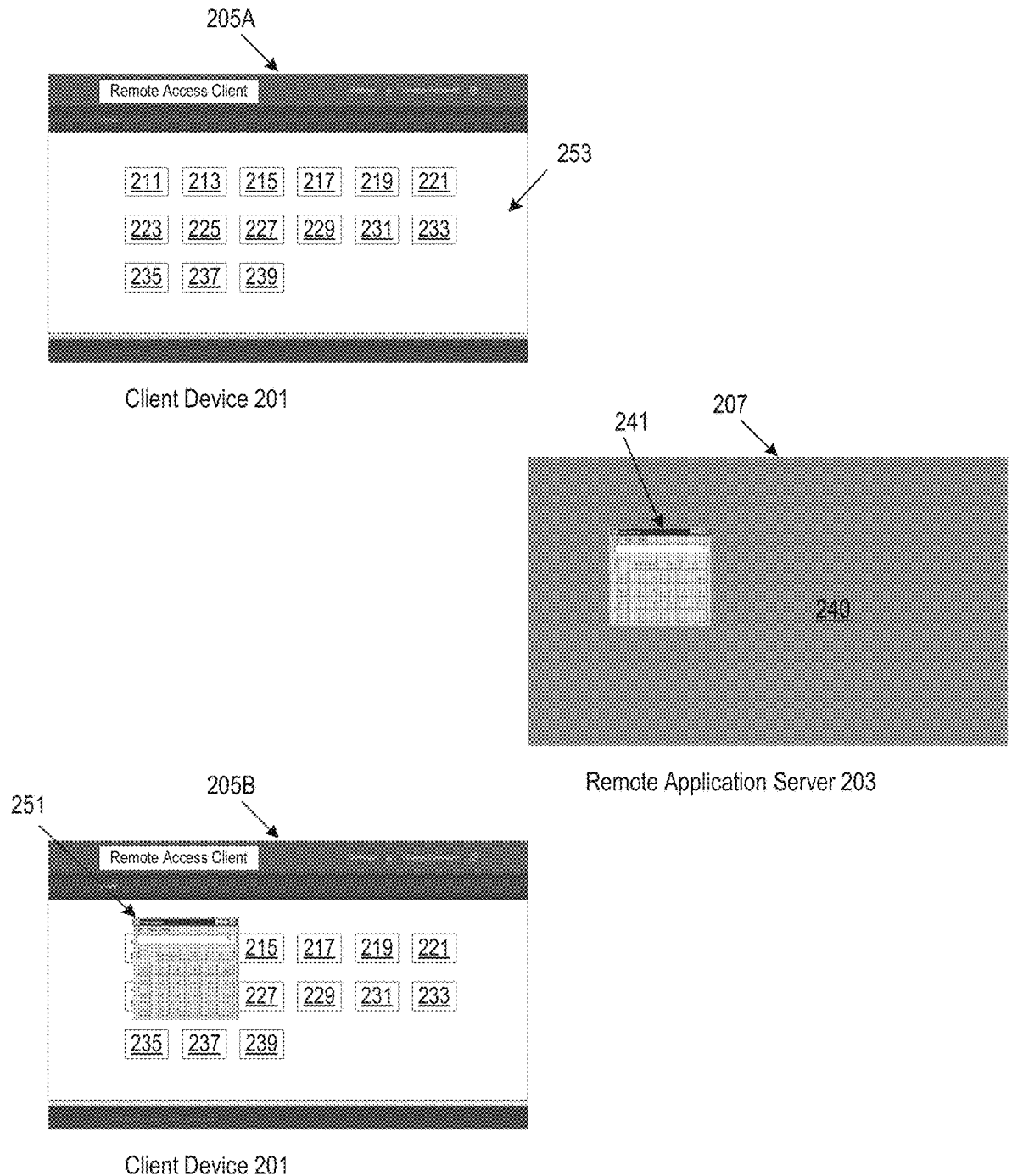
FIG. 2 illustrates an example application window for an application, which is hosted by a remote application server, in a browser window on a client device, according to various implementations of the present disclosure.

FIG. 2 illustrates an example application window for an application, which is hosted by a remote application server, in a browser window on a client device, according to various implementations of the present disclosure. A client device 201 can display a browser window 205A of a remote access client. The browser window 205A can include a document (e.g., remote access client web page 253) that displays representations (e.g., icons 211-239) of published applications that are available for a user to access remotely via the client device 201. The published applications can be hosted by different remote application servers. Icon 215 may represent a Calculator application that is hosted by remote application server 203. Icon 235 may represent a Notepad application that is hosted by a different remote application server.

The client device 201 can receive user selection of icon 215 to access the Calculator application. Remote application server 203 can receive a request from the client device 201 and start the Calculator application. Remote application server 203 can create an application window 241 for the Calculator application and display the application window 241 on a screen 207 for remote application server 203. The screen 207 can include a desktop area 240 and the application window 241. The client device 201 and remote application server 203 can establish a session (e.g., RDP session).

Unlike traditional remote application solutions that display a full desktop area 240 of a server (e.g., remote application server 203) on the display of a client device 201, aspects and implementations of the present disclosure display a portion of the screen 207. Aspects and implementations of the present disclosure display only the application windows (e.g., application window 241) of applications (e.g., Calculator application) that are being accessed by the client device 201 on the display of the client device 201. Aspects and implementations of the present disclosure hide portions (e.g., desktop area 240) of a server display on a client device 201.

A window provider (e.g., window provider 140 in FIG. 1) on remote application server 203 can send instructions to a window controller (e.g., window controller 107 in FIG. 1) on the client device 201 for displaying an application window 251 for the Calculator application within the browser window 205B on the client device 201. The application window 251 for the client device 201 can be based on properties (e.g., position, size, location, etc.) of the application window 241 on the screen 207 of remote application server 203. The instructions can include the coordinates of the application window 241, the dimensions for the size of the application window 241, and the stack order (e.g., foreground, middle-ground, background) for the application window 241.

A window can be in a foreground, which is the visual plane that appears closest to the viewer. Alternatively, a window can be in a background, which is the plane perceived furthest from the viewer. Yet alternatively, a window can be in a middle-ground, which is the visual plane located between both the foreground and background. Multiple windows can be in different middle-grounds. The stack order for a window can be specified using a z-index attribute, as described in greater detail below in conjunction with FIG. 5. The preparation of the instructions by a window provider on a server is described in greater detail below in conjunction with FIG. 7.

The window controller on the client device 201 can create and display an application window 251 for the Calculator application within the browser window 205B based on the data (e.g., coordinates, dimensions, and/or stack order) in the instructions. The desktop area 240 of remote application server 203 is not displayed on the client device 201 since the instructions do not include data pertaining to the desktop area 240 of remote application server 203. Rather than displaying the desktop area 240 of remote application server 203, the client device 201 can display a document (e.g., remote access client web page 253) within the browser window 205B of the remote access client. The application window 251 can be displayed in the foreground and the remote access client web page 253 can be displayed in the background. The displaying of the application window within the browser window is described in greater detail below in conjunction with FIG. 4.

An application can have multiple application windows. For example, the user may wish to open another window for the Calculator application, and the window controller on the client device 201 can send a request to remote application server 203. Remote application server 203 can open another window for the Calculator application on the screen 207 for remote application server 203, and send instructions for the other window for the Calculator application to the client device 201. The window controller on the client device 201 can receive the instructions for the other Calculator window, and can create and display another application window for the Calculator application within the browser window 205B based on the data (e.g., coordinates, dimensions, and/or stack order) in the instructions.

Remote application server 203 can host multiple published applications that are available to the user. When a published application is started by the remote application server 203, the window of the application can be displayed on the screen 207 of remote application server 203. The remote application server 203 can launch multiple published applications, and can display multiple application windows on the screen 207. The window controller on the client device 201 and the remote application server 203 can exchange data to create and display applications windows on the client device 201 for the multiple application windows being displayed on the screen 207. The client device 201 can access multiple applications of the remote application server 203 using the same session (e.g., RDP session) with the remote application server 203. If there is an application that has been designated as an isolated application, there can be a separate session for the isolated application.

Figure 3:
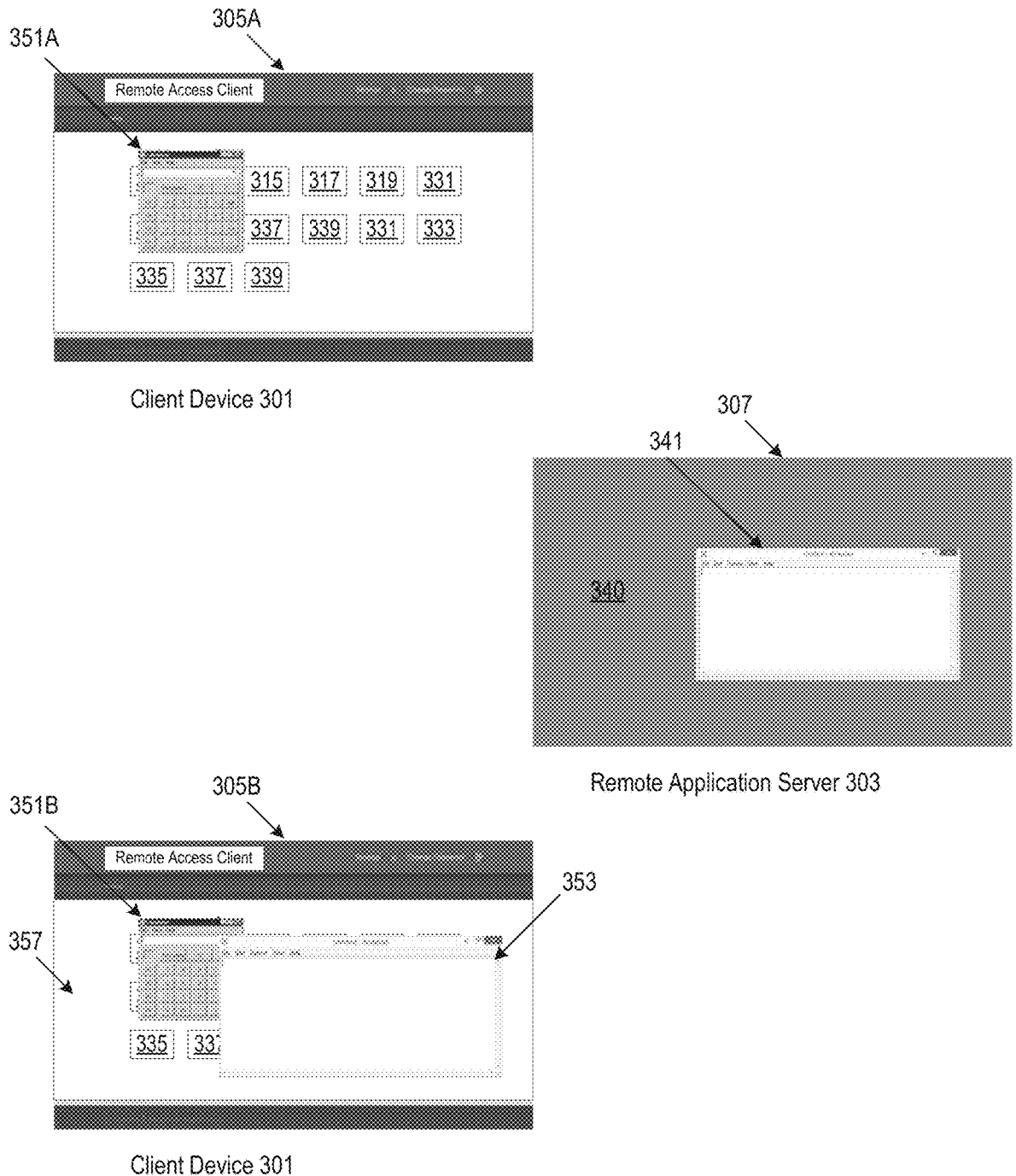
FIG. 3 illustrates example application windows for applications from different remote application servers within a same browser window on a client device, according to various implementations of the present disclosure.

FIG. 3 illustrates example application windows for applications from different remote application servers within a same browser window on a client device, according to various implementations of the present disclosure. The client device 301 can display an application window 351A for a Calculator application being hosted by remote application server (e.g., remote application server 203 in FIG. 2) within a browser window 305A of a remote access client.

The client device 301 can receive user selection of icon 335 to access a Notepad application being hosted by remote application server 303. Remote application server 303 can receive a request from the client device 301 and start the Notepad application. Remote application server 303 can create an application window 341 for the Notepad application and display the application window 341 on a screen 307 for remote application server 303. The screen 307 can include a desktop area 340 and the application window 341. The client device 301 and remote application server 303 can establish a session (e.g., RDP session).

A window provider (e.g., window provider 140 in FIG. 1) on remote application server 303 can send instructions to a window controller (e.g., window controller 107 in FIG. 1) on the client device 301 for displaying an application window 351B for the Notepad application within the browser window 305B on the client device 301. The application window 351B for the client device 301 can be based on the application window 341 on the remote application server 303. The instructions can include the coordinates of the application window 341, the dimensions for the size of the application window 341, and the stack order (e.g., foreground, middle-ground, background) for the application window 341.

The window controller on the client device 301 can receive the instructions and determine that the application window 351A for the Calculator application is currently in the foreground of the browser window 305A. The window controller can send a request to the remote application server (e.g., remote application server 203 in FIG. 2) hosting the Calculator application to change the stack order for the application window (e.g., window 241 in FIG. 2) for Calculator application on the screen (e.g., screen 207 in FIG. 2) for the remote application server for the Calculator application. The remote application server for the Calculator application can send instructions to the window controller for changing the application window 351A for the Calculator application in the browser window 305A. For example, the stack order value can be decrease by a value of 1. Placing the application window 351A for the Calculator application in the middle-ground or background is described in greater detail below in conjunction with FIG. 5.

The window controller on the client device 301 can create an application window 353 for the Notepad application and display the application window 353 in the foreground within the browser window 305B based on the data (e.g., coordinates, dimensions, and/or stack order) in the instructions from remote application server 303.

The desktop area 340 of remote application server 303 is not displayed on the client device 301 since the instructions do not include data pertaining to the desktop area 340 of remote application server 303. Rather than display the desktop area 340 of remote application server 303, the client device 301 can display the remote access client web page 357 within the browser window 305B.

The window controller can place the application window 351A for the Calculator application in the middle-ground in the browser window 305B. In one implementation, a window that is in the middle-ground can be considered to be in a background relative to a window that is in a foreground. For example, the remote access client web page 357 may be in the background, and the application window 353 for the Notepad application may be in the foreground. In one example, the application window 351B for the Calculator application can be considered to be in the middle-ground between the remote access client web page 357 and the application window 353. In another example, the application window 351B for the Calculator application can be considered to be in the background relative to placement of the application window 353. In another example, the application window 351B for the Calculator application can be considered to be in the foreground relative to placement of the remote access client web page 357.

Figure 4:
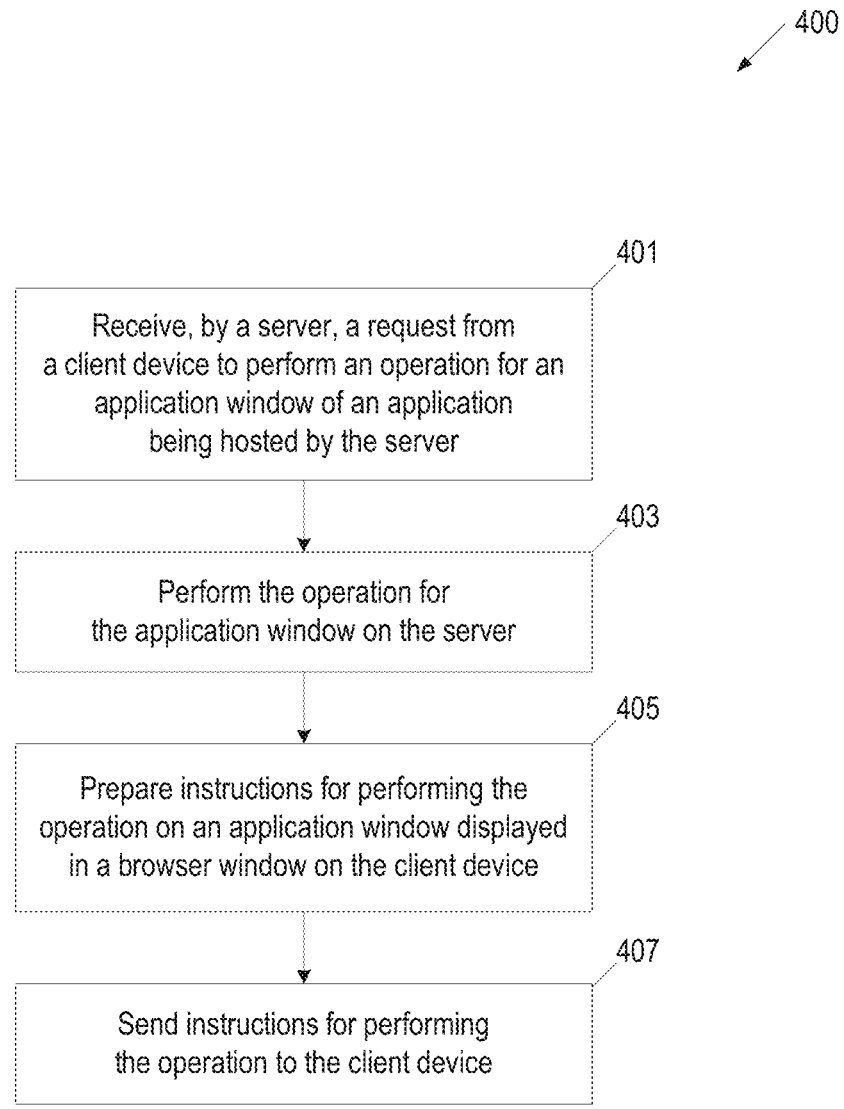
FIG. 4 depicts a flow diagram of aspects of a method for providing instructions to a client device for performing an operation on an application window, according to various implementations of the present disclosure.

FIG. 4 depicts a flow diagram of aspects of a method 400 for providing instructions to a client device for performing an operation on an application window, according to various implementations of the present disclosure. The method 400 can be performed by processing logic that may comprise hardware (circuitry, dedicated logic, etc.), software (such as is run on a general purpose computer system or a dedicated machine), or a combination of both. In one implementation, the method is performed by a window provider 140 in a remote application server (e.g., server 120, server 130 of FIG. 1), while in some other implementations one or more blocks of FIG. 4 may be performed by another machine.

At block 401, the processing device receives a request from a client device to perform an operation for an application window of an application being hosted by a remote application server being executed by the processing device. The operation can be, for example, to start an application, and create and display an application window for the application to allow a user to access the application remotely via the client device. The request can include a server identifier, a session identifier, and/or window identifier. In another example, the request may be to move an application window that is specified in the request, resize the application window, change the stack order of the application window to place the application window in a foreground, middle-ground, or background, minimize the application window, restore the application window, close the application window, copy data from the application window, paste data into the application window, etc.

The request can include mouse input and/or keyboard input that are captured by a remote access client on the client device. The mouse input can be associated with one or more mouse events, such as, mouse down, mouse right click, mouse left click, and mouse move. Capturing mouse input is described in greater detail below in conjunction with FIG. 8. The keyboard input can be associated with one or more keyboard events, such as key up, key down, and key press. The key press events can be related to alphanumeric input, function key input, Windows key input, Shift key input, Alt key input, and/or combinations of keyboard inputs. Capturing particular types of keyboard input is described in greater detail below in conjunction with FIG. 9.

At block 403, the processing device performs the operation for the application window on a screen of the remote application server. The processing device can perform the operation on the application window that currently has focus, and/or can perform the operation on an application window that is specified in the request. Focus is a feature of a window that indicates which application window within the browser window is selected to receive input. A focus attribute can be used to assign focus to a window.

The processing device can transform the data in the request into one or more hardware input events, and perform the operation via the hardware input events. For example, the request may be to access a media player application, and the processing device can start the media player application, and create and display an application window for the media player application on the screen of the remote application server.

At block 405, the processing device prepares instructions for the remote access client to perform the operation on an application window in a browser window on the client device. The processing device can copy window data for the application window being displayed by the server and include the window data in the instructions. The window data can include coordinates of the application window on the server, the dimensions for the size of the application window on the server, and the stack order (e.g., foreground, middle-ground, background) for the application window on the server. The remote application server can create an identifier for each application window that is created and can include the window identifier (ID) in the instructions. Each window identifier can be unique per server. At block 407, the processing device sends instructions for performing the operation to the client device.

Figure 5:
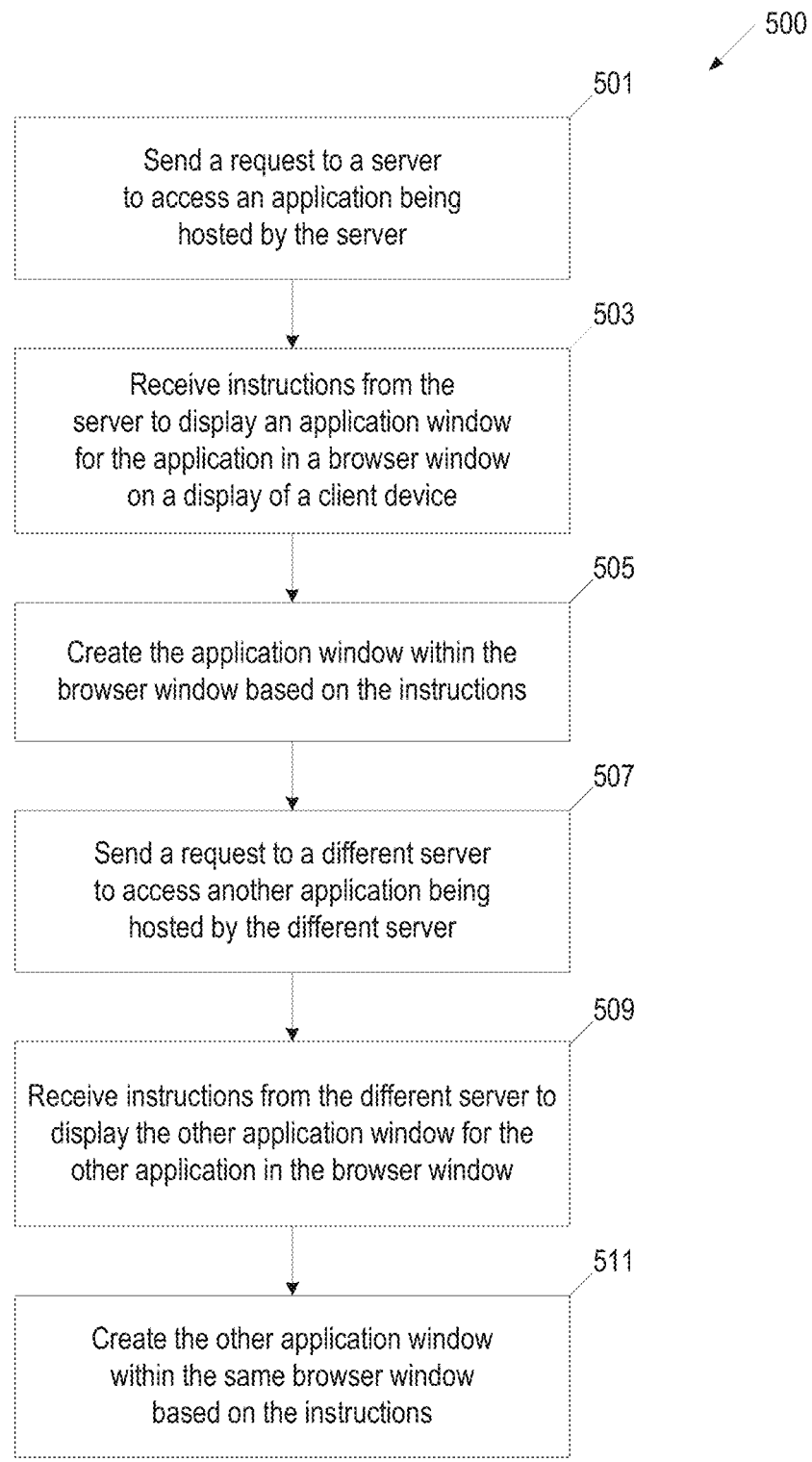
FIG. 5 depicts a flow diagram of aspects of a method for communicating with a remote application server to manage application windows of applications from different servers within a same browser window on a client device, according to various implementations of the present disclosure.

FIG. 5 depicts a flow diagram of aspects of a method 500 for communicating with a remote application server to manage application windows of applications from different servers within a same browser window on a client device, according to various implementations of the present disclosure. The method 500 can be performed by processing logic that may comprise hardware (circuitry, dedicated logic, etc.), software (such as is run on a general purpose computer system or a dedicated machine), or a combination of both. In one implementation, the method is performed by a window controller 107 and/or remote access client 105 in a client device 103 of FIG. 1, while in some other implementations one or more blocks of FIG. 5 may be performed by another machine.

At block 501, the processing device sends a request to a server to access an application being hosted by the server. The processing device detects user input identifying the application to access. For example, an icon for a media player application may be selected. The processing device can access application data that is stored in a data store (e.g., data store 170 in FIG. 1) to determine which server is hosting the application, and can send a request to the server for access to the application. The request can include the application identifier of the application. For example, the processing device may determine that Server-A hosts the media player application and can send a request to Server-A for access to the media player application.

At block 503, the processing device receives instructions from the server ("first server") to display an application window ("first application window") for the application ("first application") in a browser window on a display of a client device. The instructions can include a session identifier, a window identifier for the application window, and window data for the application window to be displayed within a browser window on the client device. The processing device can create a session (e.g., RDP session) with the first server for accessing the first application. The window data can include, for example, coordinates for the application window, dimensions for the size of the application window, and a stack order (e.g., foreground, middle-ground, background) for placing the application window within the browser window on the client device. For example, the processing device receives instructions from Server-A which includes window data for displaying a media player window of a particular size, within a foreground in the center of the browser window of a remote access client.

The processing device can create and/or maintain mapping data that maps the application windows, which are created within the browser window on the client device, to corresponding servers and corresponding sessions (e.g., RDP sessions). The mapping data can be a data structure (e.g., a table, a file, etc.) that includes an entry for each application window within the browser window. An entry can include the window identifier for the application window, and a corresponding server and corresponding session for the application window. The mapping data can be stored in a local data store, and can be used by the remote access client to forward mouse events and keyboard events, which are detected by the processing device, to an appropriate server and session (e.g., RDP session), as described in greater detail below in conjunction with FIGS. 7-9.

At block 505, the processing device creates the first application window within the browser window based on the instructions. The processing device can extract information (e.g., size, coordinates, stack order, etc.) from the window data in the instructions, and create an HTML <div> element for the application window. The <div> element can represent the application window.

The processing device can use the information (e.g., size, coordinates, stack order, etc.) that is extracted from the window data to assign values to properties for the <div> element. The <div> element can include a position property. The position property specifies the type (e.g., static, relative, fixed or absolute) of a positioning method used for the <div> element. In one implementation, the processing device assigns an absolute value to the position property. The processing device can determine values from the information in the instructions to position the application using the top, bottom, left, and right properties for the <div> element. Windows can be displayed on top of each other by using a z-index property of the <div> element. The processing device can determine a value from the information in the instructions to assign to a z-index property for the <div> element to place the application in the foreground, middle-ground, or background. The z-index property specifies the stack order for the <div> element (e.g., window), for example, using a negative or positive value (e.g., integer). A <div> element (e.g., window) having a greater stack order value can be placed in front of a <div> element (e.g., window) having a lower stack order value. The processing device can change the DOM for the document (e.g., remote access client web page 194 in FIG. 1) in the browser window to add the <div> element to the HTML code to create the application window for the first application (e.g., media player application) within the browser window.

The processing device can specify that the content should be placed in the application window by adding a <canvas> element to the <div> element for application window. The instructions from the server can include data (e.g., script) which the processing device can use to create the graphics (e.g., application GUI) for the <canvas> element.

The processing device can update the DOM for the document (e.g., remote access client web page 194 in FIG. 1) in the browser window to add the <canvas> element in the <div> element for the application window, and execute a script (e.g., Javascript), which is received as part of the instructions, to generate the content (e.g., application GUI) for the application window for the first application (e.g., media player application) within the browser window. The updating of the DOM can automatically display the content (e.g., application GUI) of the remote access client web page (e.g., remote access client web page 194 in FIG. 1) in the browser window. The processing device may display the application window in the foreground of the browser window and can assign keyboard focus to the application window. The focus indicates which application window within the browser window is selected to receive input.

At block 507, the processing device sends a request to a different server to access another application ("second application") that is being hosted by the different server. The processing device detects user selection of a second application to access. For example, a user may select an icon for a map application from the remote access client web page in the browser window on the client device. The processing device can access application data to determine which server is hosting the application (e.g., map application), and can send a request to the server for access to the application. The request can include the application identifier of the application. For example, the processing device may determine that Server-B hosts the map application and can send a request to Server-B for access to the map application.

At block 509, the processing device receives instructions from the different server ("second server") to display an application window ("second application window") for the second application in the same browser window. The processing device can create a session (e.g., RDP session) with the second server for accessing the second application. The instructions can include a session identifier, a window identifier for the application window, and window data for the application window to be displayed within the browser window. For example, the processing device receives instructions from Server-B that includes window data for displaying a map application window within the browser window. The processing device can add an entry in the mapping data for the second application window for the second application.

At block 511, the processing device creates the second application window within the same browser window based on the instructions. The processing device can extract information (e.g., size, coordinates, stack order, etc.) from the window data in the instructions, and can edit the DOM for the document (e.g., remote access client web page 194 in FIG. 1) in the browser window to add a <div> element to the HTML code to create the application window for the second application (e.g., map application) within the browser window.

The instructions can indicate that the second application window should be placed in the foreground within the browser window. The processing device can determine that the first application window is currently in the foreground of the browser window. The processing device can request that the first application window be placed in the background, as described in greater detail below in conjunction with FIG. 6.

Referring to block 511 in FIG. 5, the processing device can update the DOM for the document (e.g., remote access client web page 194 in FIG. 1) in the browser window to add the <canvas> element in the <div> element for the second application window and execute a script (e.g., Javascript), which is received as part of the instructions, to create the content for the second application window for the second application (e.g., map application) within the browser window. The updating of the DOM can cause the browser window to immediately display the content of the remote access client web page (e.g., remote access client web page 194 in FIG. 1) in the browser window. The processing device may display the second application window for the map application in the foreground and can assign keyboard focus to the second application window. The processing device may display the first application window for the media player application in the background.

Figure 6:
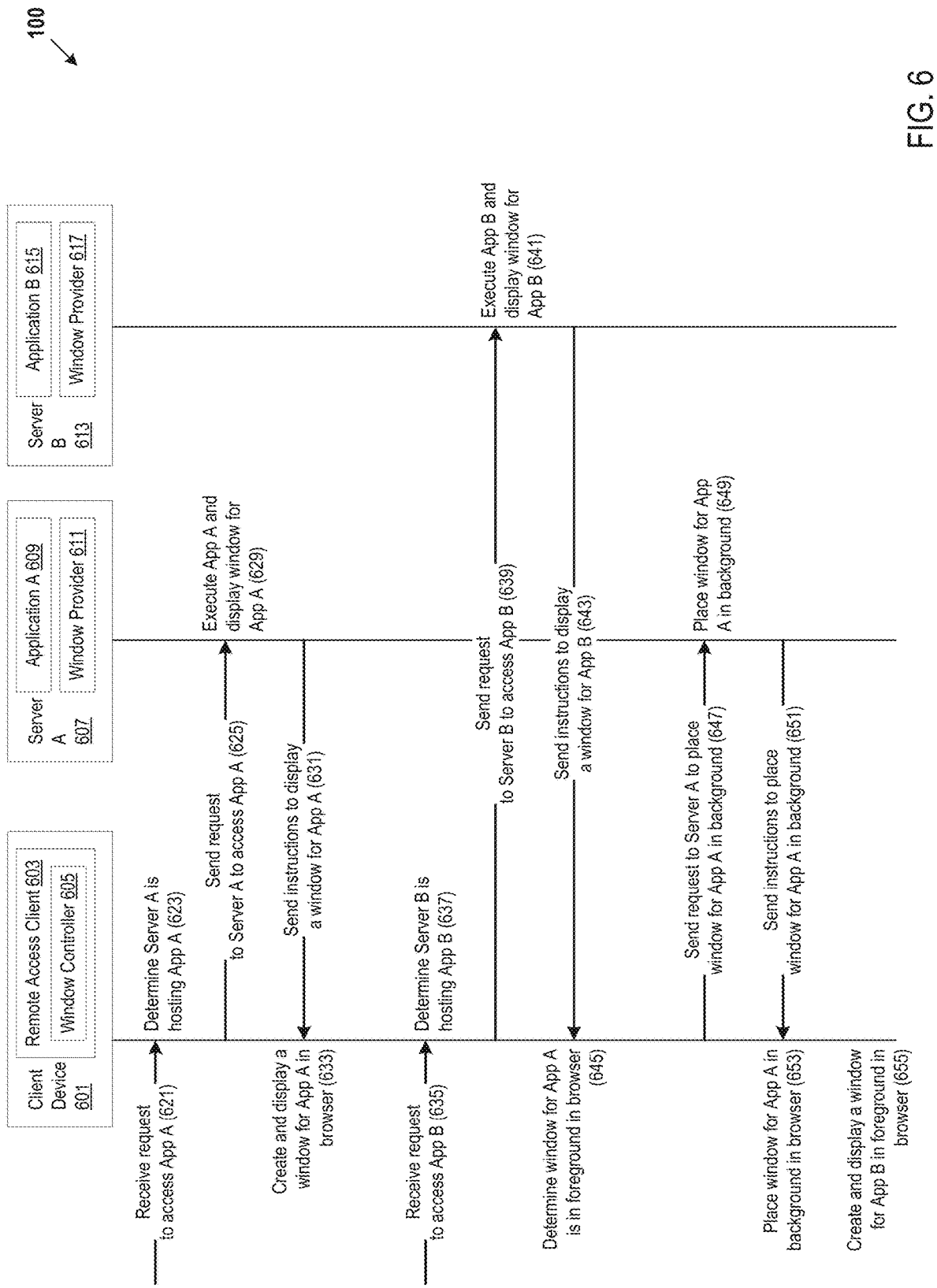
FIG. 6 depicts a block diagram of example interactions between a remote access client and different remote applications servers for managing application windows of applications from the different remote application servers within a same browser window on a client device, according to various implementations of the present disclosure.

FIG. 6 depicts a block diagram 600 of example interactions between a remote access client and different remote applications servers for managing application windows of applications from the different remote application servers within a same browser window on a client device, according to various implementations of the present disclosure. A client device 601 executes a remote access client 603 via a browser application, and displays a browser window for the remote access client 603. The remote access client 603 can access applications (e.g., Application A 609, Application B 615) being hosted by remote application servers (e.g., Server A 607, Server B 613).

The remote access client 603 receives (621) a request to access a published application, Application ("App A") 609. For example, App A 609 is an email application, and a user selects an email application icon on a web page for the remote access client 603 in the browser window. A window controller 605 of the remote access client 603 determines (623) that Server A 607 is hosting App A 609, and sends (625) a request to Server A 607 to access App A 609.

Server A 607 receives the request, executes (629) App A 609, and displays an application window for App A 609 on a display for Server A 607. The window provider 611 on Server A 607 sends (631) instructions to the window controller 605 to display a window for App A within the browser window for the remote access client 603 on the client device 601. The instructions can include a window identifier, stack order (e.g., foreground, middle-ground, background), coordinates, and/or dimensions for creating the window for App A on the client device 601. The window controller 605 receives the instructions, and creates and displays (633) an application window for App A within the browser window for the remote access client 603 on the client device 601.

The remote access client 603 receives (635) a request to access another published application, Application ("App B") 615 being hosted by a different remote application server, Server B 613. For example, App B 615 may be a spreadsheet application, and a user selects an icon for the spreadsheet application on the web page for the remote access client 603 in the browser window. The window controller 605 determines (637) that Server B 613 is hosting App B 615, and sends (639) a request to Server B 615 for access to App B 615.

Server B 615 receives the request, executes (641) App B 615, and displays an application window for App B 615 on a display for Server B 613. The window provider 617 on Server B 613 sends (643) instructions to the window controller 605 to display a window for App B within the browser window for the remote access client 603 on the client device 601. The instructions can include a window identifier, stack order (e.g., foreground, middle-ground, background), coordinates, and/or dimensions for creating the window for App B on the client device 601.

The window controller 605 receives the instructions, which can indicate that the window for App B should be displayed in the foreground within the browser window. For example, the instructions can include a z-index property for the second application window indicating that the second application window should be placed in the foreground within the browser window.

The window controller 605 determines (645) that the window for App A is already in the foreground in the browser window, and sends (647) a request to Server A 607 to place the window for App A 609 in the background on a display for Server A 607. The request can include a command for changing the stack order of the window for App A to remove the window for App A from the foreground. The request can include the window identifier for App A to specify to Server A 607 which window to move to the background. The requests, commands, and/or instructions that are sent from a remote access client to a remote application server, and vice versa, can include a server identifier, a session identifier, and/or a window identifier. The identifiers can be unique per server.

Server A 603 receives the request, identifies from the window identifier in the request which window the request pertains to, and places (649) the application window for App A in the background on a display for Server A 603. The window provider 611 on Server A 607 sends (651) instructions to the window controller 605 to place the window for App A in the background within the browser window on the client device 601. The window controller 605 receives the instructions and places (653) the application window for App A in the background within the browser window. The window controller 605 can place the application window for App A in the background within the browser window by updating the DOM for the document (e.g., web page) for the browser window. The window controller 605 can change the z-index property value in the <div> element that represents the application window for App A to a value that places the application window for App A in the background. For example, the window controller 605 may change (e.g., decrease) the z-index property by a value of one.

The window controller 605 displays (655) an application window for App B in the foreground within the browser window on the client device 601. The processing device can remove the focus from the application window for App A and assign focus to the application window for App B. The window controller 605 can place the application window for App B in the foreground within the browser window by assigning a z-index property value in the <div> element that represents the application window for App B to a value (e.g., maximum possible value such as "99") that places the application window for App B in front of other windows (e.g., window for App A) in the browser window. The window controller 605 can update the DOM for the document to display the results of the changed properties.

Figure 7:
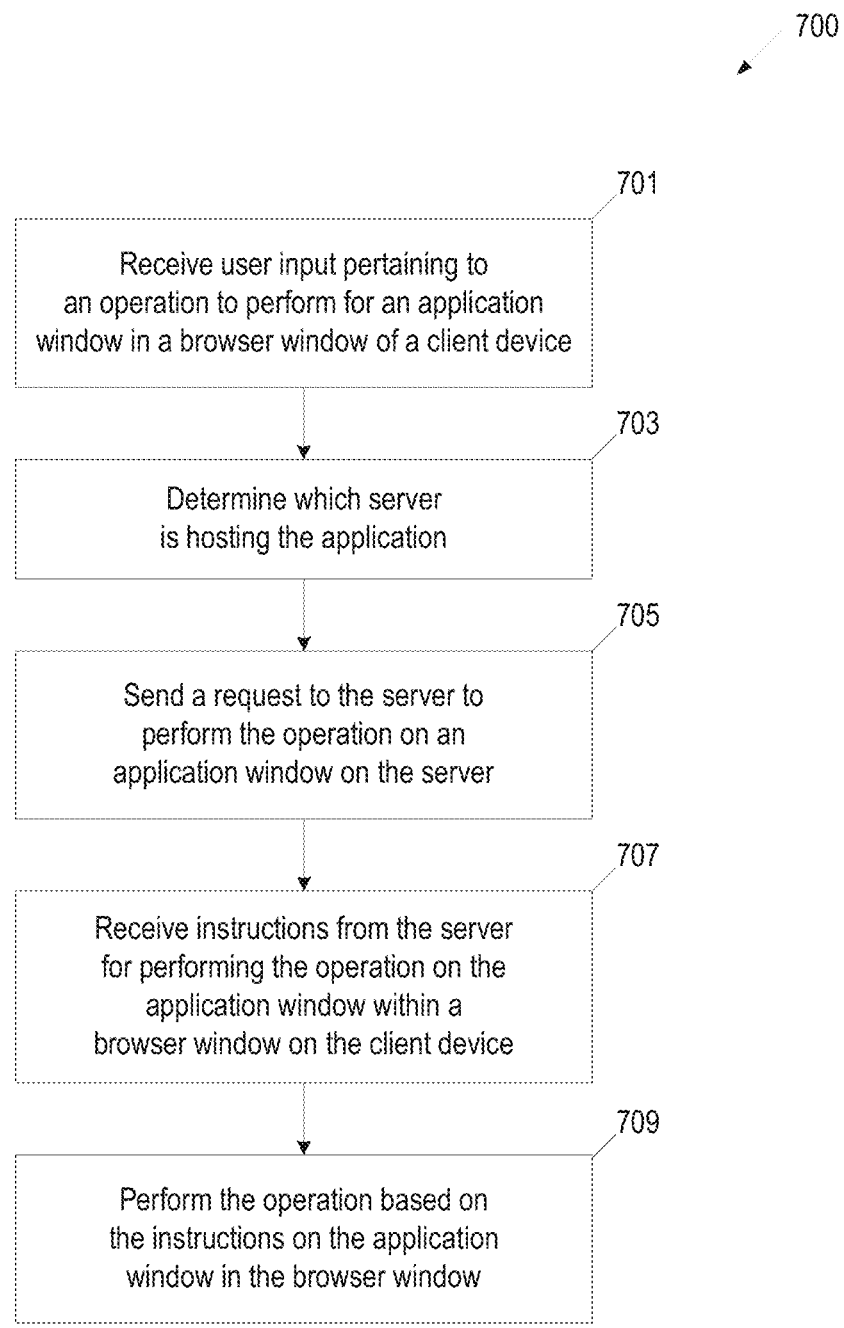
FIG. 7 depicts a flow diagram of aspects of a method for managing application windows of applications from different remote application servers within a same browser window on a client device, according to various implementations of the present disclosure.

FIG. 7 depicts a flow diagram of aspects of a method 700 for managing application windows of applications from different remote application servers within a same browser window on a client device, according to various implementations of the present disclosure. The method 700 can be performed by processing logic that may comprise hardware (circuitry, dedicated logic, etc.), software (such as is run on a general purpose computer system or a dedicated machine), or a combination of both. In one implementation, the method is performed by a window controller 107 in a client device 103 of FIG. 1, while in some other implementations one or more blocks of FIG. 7 may be performed by another machine.

At block 701, the processing device receives user input pertaining to an operation to perform for an application window in a browser window of a client device. For example, the operation may be to start an application, which is being hosted by a remote application server, and create an application window for the application in the browser window. The user input may be mouse input and/or keyboard input selecting an icon for the application to start. In another example, the operation may be to change the display of an application window in the browser window. For example, the change may be to move the application window, resize the application window, minimize the application window, restore the application window, etc. The user input may be mouse input selecting a representation (e.g., icon) for the application on a remote access client web page. The user input may be mouse input (e.g., mouse down, mouse move, mouse up, left click, right click, etc.) and/or keyboard input (e.g., keyup, keydown, keypress) specifying the change. The user input can be related to a tray icon being displayed on a screen of the client device. For example, the mouse input may be a selection from the tray icon. Capturing mouse input using a transparent window is described in greater detail below in conjunction with FIG. 8. A keydown is when a key is pressed down. A keyup is when a key is released. A keypress is when a character key is pressed. Capturing particular keyboard input is described in greater detail below in conjunction with FIG. 9.

Referring to FIG. 7, at block 703, the processing device determines which server (e.g., remote application server) is hosting the application. The processing device can access mapping data to determine which remote application server is hosting the application. The mapping data can associate application windows, which are created within the browser window on the client device, to corresponding remote application servers and corresponding sessions (e.g., RDP sessions). The mapping data can include an entry for each application window within the browser window. An entry can include the window identifier for the application window, and a corresponding remote application server and corresponding session for the application window. For example, the operation may be to place the application window for App A in the background within the browser window. The processing device can determine, from the mapping data, which remote application server to send the request to. The processing device can determine a session identifier and/or a window identifier from the mapping data.

At block 705, the processing device sends a request to the remote application server to perform the operation on an application window on the remote application server. The request can include a session identifier and/or remote application server identifier. The request can include the user input (e.g., mouse input, keyboard input) and/or one or more commands, such as, for moving a particular application window to the foreground or the background. The user input can include input device states (e.g., mouse button states), coordinates, and/or dimensions for the operation. For example, the request may be to resize a window and can include dimensions for resizing the window.

The remote application server can receive the request, and can perform the operation using the data in the request. The request may not include a window identifier, and the remote application server can perform the requested operation on the application window that currently has focus on the remote application server. In another example, the request can include a window identifier for an operation, such as, moving a particular window to the background. The remote application server can receive the request, and can perform the operation using the window identifier in the request to move the corresponding window to the background. The remote application server can prepare instructions for the client device for performing the operation, and send the instructions to the client device, as described in greater detail above in conjunction with FIG. 4.

Referring to FIG. 7, at block 707, the processing device receives instructions from the remote application server for performing the operation on the application window for the application within the browser window on the client device. The instructions from the remote application server can include one or more commands for performing the operation for an application window, such as, creating the application window, changing a configuration (e.g., name, size, position) of the application window, deleting the application window, minimizing the application window, restoring the application window, etc.

At block 709, the processing device performs the operation based on the instructions on the application window within the browser window. The processing device can update the DOM for the remote access client web page in the browser window based on data in the instructions. For example, the processing device can use a window identifier in the request to determine which <div> element and/or which <canvas> element to update. The processing device can, for example, edit a property (e.g., z-index, position, height, width, left, top, etc.) of the <div> element in the DOM for the application window and/or edit an attribute of a <canvas> element in the DOM. When the DOM is updated, the browser window can display a result of the updated DOM. For example, the updated DOM can cause an application window to have a changed configuration (e.g., changed name, changed size, changed position, changed stack order), be deleted, be minimized, be restored, etc.

The client may send a request to exit from an application. For example, at block 701, the processing device may detect user input (e.g., mouse input) for performing an exit operation on a Calculator application. At block 703, the processing device may determine that Server-X is hosting the Calculator application, and at block 705, may send a request to Server-X to close the Calculator application. Server-X can close the local Calculator application and send instructions to the processing device for closing the Calculator application on the client device. At block 707, the processing device can receive the instructions and perform the close operation for the Calculator application.

In one implementation, when the processing device closes the last remaining application from a particular remote application server (e.g., Server-X), the RDP session between the remote access client and the remote application server (e.g., Server-X) is not disconnected until a time period has elapsed. Rather than immediately closing the RDP session, and having to start a new RDP session for a new request to access an application from the same remote application server (e.g., Server-X), the processing device can create a time delay to monitor for any requests for accessing applications on the same remote application server, which can use the existing RDP session. The time period defines a delay, during which, a user may request access to another application from the same remote application server (e.g., Server-X). If the processing device detects a request access to another application from the same remote application server, the processing device can use the existing RDP session between the remote access client and the remote application server for accessing the other application. If the processing device does not detect a request access to another application from the same remote application server within the time delay, the processing device can terminate the RDP session between the remote access client and the remote application server. The time period can be configurable and/or user (e.g., system administrator) defined. For example, the time period may be 25 seconds.

Figure 8:
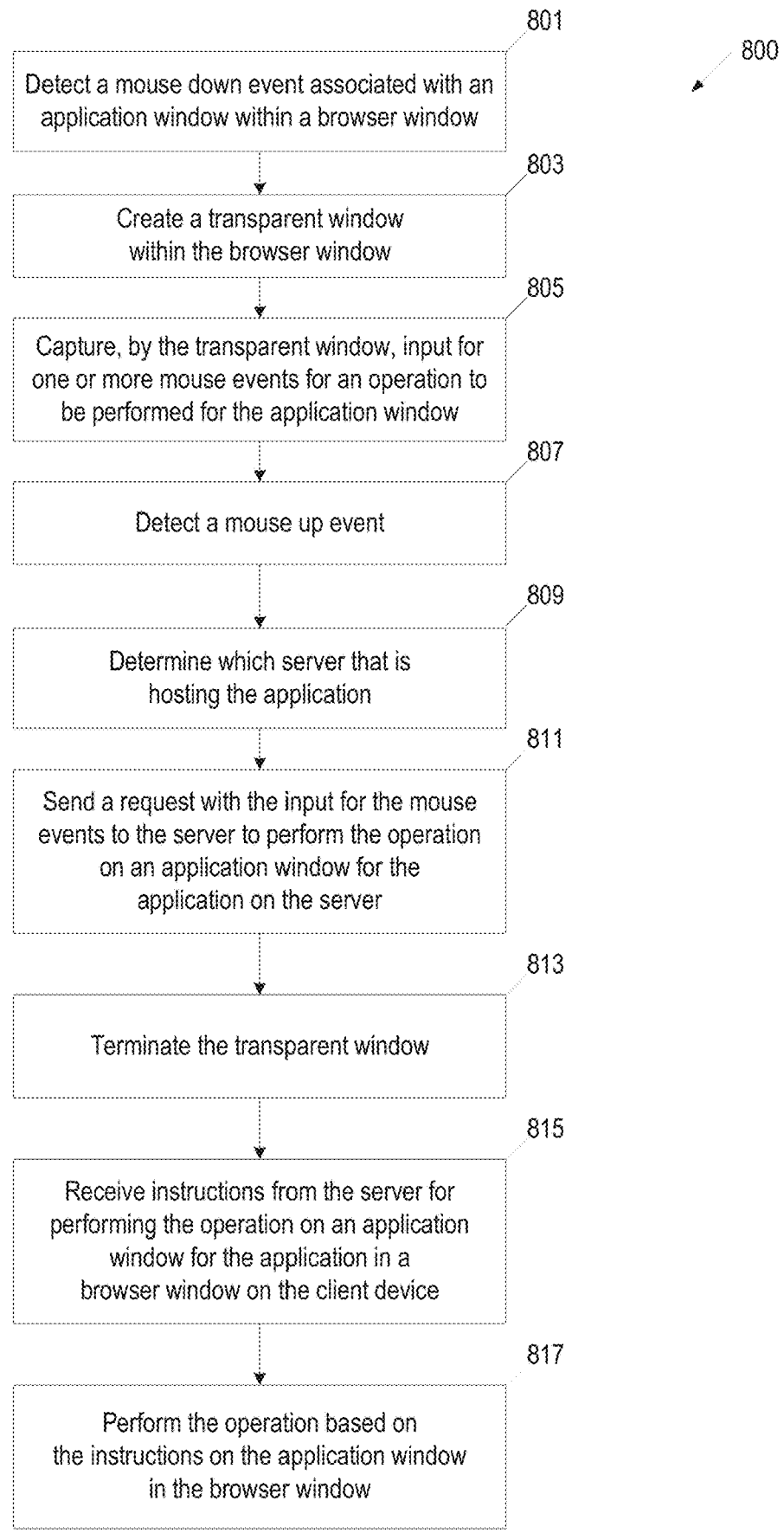
FIG. 8 depicts a flow diagram of aspects of a method for capturing input for mouse events for an application, according to various implementations of the present disclosure.

FIG. 8 depicts a flow diagram of aspects of a method 800 for capturing input for mouse events for an application, according to various implementations of the present disclosure. The method 800 can be performed by processing logic that may comprise hardware (circuitry, dedicated logic, etc.), software (such as is run on a general purpose computer system or a dedicated machine), or a combination of both. In one implementation, the method is performed by a window controller 107 in a client device 103 of FIG. 1, while in some other implementations one or more blocks of FIG. 8 may be performed by another machine.

Based on user interactions with an application window, mouse events may occur quickly for the particular application window, and some mouse events may not be received by the corresponding remote application server. For example, when sudden mouse movements occur while dragging an application window, the mouse may move outside of the application window. Aspects and implementations of the present disclosure create a transparent window within the browser window for capturing input device (e.g., mouse) events.

At block 801, the processing device detects a mouse down event associated with an application window within a browser window, and creates a transparent window within the browser window at block 803. The transparent window is displayed on the client device and is invisible to a user. The size of the transparent window is greater than the application window. In one implementation, the size of the transparent window is the same size as browser window. The processing device can create a <div> element for the transparent window. The processing device can set a transparency value or opacity value for a background property for the <div> element, add the <div> element for the transparent window to the DOM of the remote access client web page, which can cause the browser window to display the transparent window. The processing device can associate the transparent window with the application window.

At block 805, the processing device captures, by the transparent screen window, one or more mouse events for an operation to be performed on the application window. The mouse events can include, for example, mouse movements and mouse button states. The processing device can capture coordinates and application window dimensions that are associated with the mouse events.

At block 807, the processing device detects a mouse up event, and determines which remote application server is hosting the application responsive to the mouse up event at block 809. The processing device can access mapping data to determine which remote application server is hosting the application. At block 811, the processing device sends a request with the input for the mouse event(s) to the remote application server to perform the operation on an application window for the application on the remote application server. The request can include a session identifier and/or remote application server identifier. The request can include the user input (e.g., mouse input, keyboard input) and/or one or more commands for the operation (e.g., moving a particular application window to the foreground or the background). The user input can include input device states (e.g., mouse button states), coordinates, and/or dimensions for the operation.

At block 813, the processing device terminates the transparent window. The processing device can update the DOM by removing the <div> element for the transparent window from the DOM of the remote access client web page, which causes the browser window to delete the transparent window from the browser window. At block 815, the processing device receives instructions from the remote application server for performing the operation on an application window for the application in a browser window on the client device. The instructions from a remote application server can include one or more commands for performing an operation for an application window, such as, changing a configuration (e.g., name, size, position) of the application window, deleting the application window, minimizing the application window, restoring the application window, etc.

At block 817, the processing device performs the operation based on the instructions on the application window within the browser window. The processing device can update the DOM for the remote access client web page based on the data in the instructions, which can cause the browser window to display a result of the updated DOM. For example, the updated DOM can cause the display of an application window to have a changed configuration (e.g., changed name, changed size, changed position), be deleted, be minimized, be restored, etc.

Figure 9:
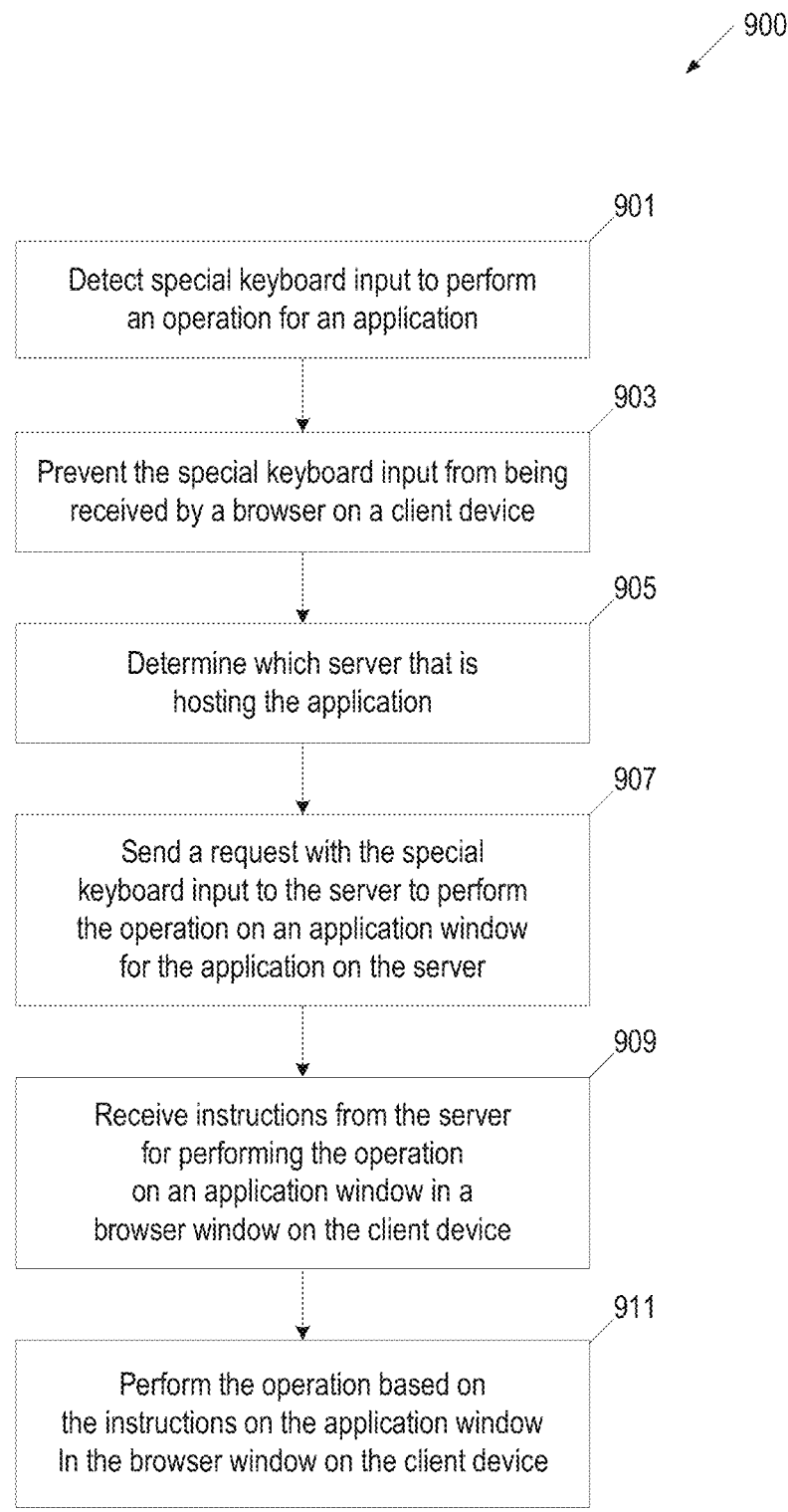
FIG. 9 depicts a flow diagram of aspects of a method for capturing special keyboard input for an application, according to various implementations of the present disclosure.

FIG. 9 depicts a flow diagram of aspects of a method 900 for capturing special keyboard input for an application, according to various implementations of the present disclosure. The method 900 can be performed by processing logic that may comprise hardware (circuitry, dedicated logic, etc.), software (such as is run on a general purpose computer system or a dedicated machine), or a combination of both. In one implementation, the method is performed by a window controller 107 in a client device 103 of FIG. 1, while in some other implementations one or more blocks of FIG. 9 may be performed by another machine.

Keyboard input can include selection of one or more types of keys. The key types can include, for example, alphanumeric keys, function keys, modifier keys, cursor keys, and system commands. The alphanumeric keys can include alphabetical, numeric, and punctuation keys. Modifier keys are keys that modify the normal action of another key, when the two keys are pressed in combination. For example, <Alt>+<F4> in a Windows® environment can close an application in an active window. The modifier keys can include the Control key, Shift key, and the Alt key. The cursor keys can include a variety of keys which move a cursor to different positions on a screen.

Keyboard input that is intended to be applied to an application window for a particular application that is within a browser may be intercepted by the browser, and the browser may apply the keyboard input to the browser application instead of the intended application. For example, there may be a window for a Calculator application within a browser window. The window application for the Calculator application may have focus and a user may press the F1 function key to display Help information for the Calculator application. Since the window for the Calculator application is embedded within the browser window, the browser application may intercept the keyboard event of the F1 function key being pressed and may display the Help information for the browser application instead of the Calculator application. Aspects and implementations of the present disclosure prevent a browser from intercepting special keyboard input and direct the special keyboard input to the intended remote application server.

At block 901, the processing device detects special keyboard input for performing an operation for an application. The processing device can capture, via an application window, keyboard input and compare the keyboard input to interception data that is stored in a data store. The interception data can specify various keyboard inputs that should be flagged by the processing device as "special" keyboard input that should be intercepted and prevented from reaching the browser. The interception data can include, for example, a list of function keys, Windows keys, Shift key, Alt key, and/or various combinations of such keys. The interception data can be configurable and user (e.g., system administrator) defined.

At block 903, the processing device prevents the special keyboard input from being received by a browser on the client device. The processing device can implement key stroke handling code in JavaScript to intercept the special keyboard input to prevent the special keyboard input from reaching the browser.

At block 905, the processing device determines which remote application server is hosting the application. The processing device can access mapping data to determine which remote application server is hosting the application.

At block 907, the processing device sends a request with the special keyboard input to the remote application server to perform the operation on an application window on the remote application server. At block 909, the processing device receives instructions from the remote application server for performing the operation on an application window for the application in a browser window on the client device. The instructions from a remote application server can include one or more commands for performing an operation for a window, such as, creating a window, changing a configuration (e.g., name, size, position) of a window, deleting a window, minimizing a window, restoring a window, etc.

At block 911, the processing device performs the operation based on the instructions on the application window within the browser window. The processing device can update the DOM for the remote access client web page based on data in the instructions, which can cause the browser window to automatically display a result of the updated DOM without having to refresh the remote access client web page.

Figure 10:
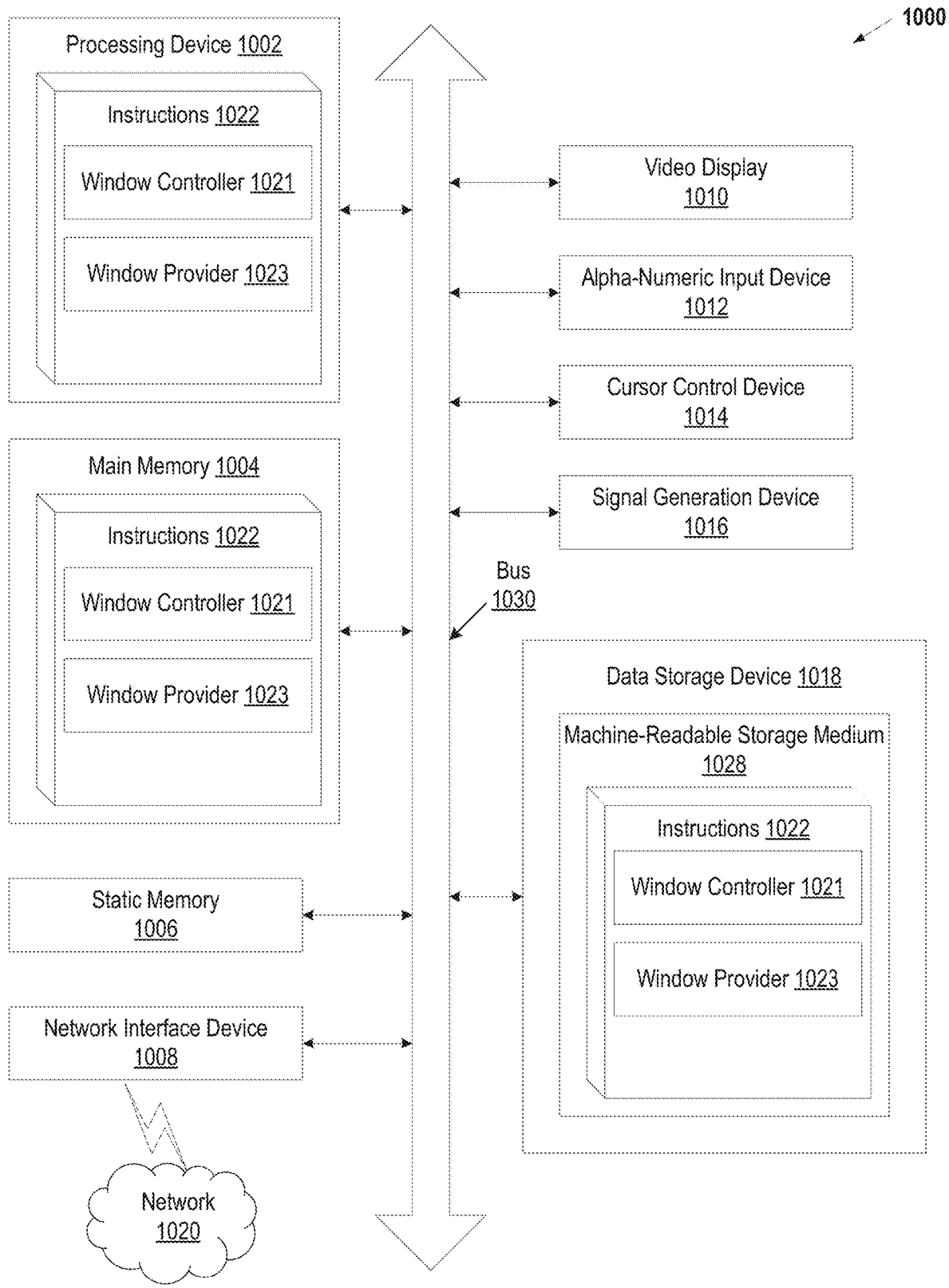
FIG. 10 depicts a block diagram of an example computing device operating in accordance with one or more aspects of the present disclosure.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or DRAM (RDRAM), etc.), a static memory 1006 (e.g., flash memory, static random access memory (SRAM), etc.), and a data store device 1018, which communicate with each other via a bus 1030.

Processing device 1002 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1022 for performing the operations and steps discussed herein.

The computer system 1000 may further include a network interface device 1008. The computer system 1000 also may include a video display unit 1010 (e.g., a liquid crystal display (LCD) or a cathode ray tube (CRT), an alphanumeric input device 1012 (e.g., physical keyboard, onscreen keyboard), a cursor control device 1014 (e.g., a mouse, stylus, touch pad, track point), and a signal generation device 1016 (e.g., speaker).

The data storage device 1018 may include a machine-readable storage medium 1028 (also known as a computer-readable medium) on which is stored one or more sets of instructions or software 1022 embodying any one or more of the methodologies or functions described herein. The instructions 1022 may also reside, completely or at least partially, within the main memory 1004 and/or within the processing device 1002 during execution thereof by the computer system 1000, the main memory 1004 and the processing device 1002 also constituting machine-readable storage media.

In one implementation, the instructions 1022 include instructions for a window controller 1021 (e.g., window controller 107 of FIG. 1) and/or a window provider 1023 (e.g., window provider 140 of FIG. 1), and/or a software library containing methods that call the window controller and/or window provider. While the machine-readable storage medium 1028 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "sending" or "receiving" or "creating" or "determining" or "displaying" or "detecting" or "associating" or "capturing" or "terminating" or "preventing" or "performing" or "updating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
rendering to a user of an electronic device a browser window of a browser application in execution upon the electronic device;
rendering to the user of the electronic device a plurality of application windows within the browser where each application window of the plurality of application windows is associated with an application in execution upon a remote application server of a plurality of remote application servers; and
executing a process upon the electronic device comprising:
determining an application window of the plurality of application windows within the browser is currently in focus;
capturing keyboard input established by the user via a keyboard interface of the electronic device;
determining that the keyboard input is special keyboard input in dependence upon interception data for the application window of the plurality of application windows currently in focus stored within a database; and
upon a positive determination that the keyboard input is special keyboard input executing a further process comprising the steps of:
blocking the special keyboard input from being provided to the browser application;
determining which remote application server of the plurality of remote application servers is hosting the application window of the plurality of application windows currently in focus;
transmitting a request comprising the special keyboard input to the remote application server of the plurality of remote application servers to perform an operation upon a remote application window of an application associated with the application window of the plurality of application windows currently in focus;
receiving from the remote application server of the plurality of remote application servers hosting the application window of the plurality of application windows currently in focus instructions for performing an operation upon the application window of the plurality of application windows currently in focus; and performing the operation with the electronic device on the application window of the plurality of application windows currently in focus; wherein
performing the operation with the electronic device on the application window of the plurality of application windows currently in focus comprises updating a document object model (DOM) for a remote access client web page associated with the application window of the plurality of application windows currently in focus based upon data contained within the instructions;
the browser window automatically displays a result of the updated DOM; and
the browser windows is updated without a refresh of the remote access client web page.

2. The method according to claim 1, wherein
the process comprises:
   determining an application window of the plurality of application windows within the browser is currently in focus;
   detecting with the processing device a mouse down event associated with the application window of the plurality of application windows currently in focus;
   creating a transparent window within the browser window;
   capturing with the processing device one or more other mouse events within the transparent window prior to the detection of a mouse up event;
   detecting with the processing device a mouse up event associated with the transparent window;
   determining which remote application server of the plurality of remote application servers is hosting the application window of the plurality of application windows currently in focus; and
   transmitting a request comprising input for the one or more mouse events to the determined remote application server of the plurality of remote application servers to perform an operation upon a remote application window of an application associated with the application window of the plurality of application windows currently in focus.

3. The method according to claim 2, wherein
the process further comprises:
   receiving instructions from the determined remote application server of the plurality of remote application servers for performing an operation on the application window of the plurality of application windows currently in focus; and
   performing the operation based on the instructions on the on the application window of the plurality of application windows currently in focus within the browser window.

4. The method according to claim 3, wherein
the received instructions include one or more commands for performing the operation on the application window of the plurality of application windows currently in focus where each command is selected from the group comprising:
   changing a name of the application window of the plurality of application windows currently in focus;
   changing a size of the application window of the plurality of application windows currently in focus;
   changing a name of the application window of the plurality of application windows currently in focus;
   deleting the application window of the plurality of application windows currently in focus;
   minimizing the application window of the plurality of application windows currently in focus; and
   restoring the application window of the plurality of application windows currently in focus.

5. The method according to claim 3, wherein
the received instructions cause the processing device to update a document object model (DOM) for a remote access client web page associated with the application window of the plurality of application windows currently in focus based upon data contained within the instructions; and
the browser window automatically displays a result of the updated DOM; and
the browser windows is updated without a refresh of the remote access client web page.

6. The method according to claim 2, wherein
the transparent window is larger than the application window of the plurality of application windows currently in focus.

7. The method according to claim 2, wherein
the transparent window is larger than the application window of the plurality of application windows currently in focus;
coordinates of the one or more other mouse events are outside the application window of the plurality of application windows currently in focus but within the transparent window.

8. The method according to claim 2, wherein
the transparent window is larger than the application window of the plurality of application windows currently in focus;
the one or more other mouse events captured with respect to the transparent window occur a rate faster than a rate of mouse events the application window of the plurality of application windows currently in focus can process.

9. The method according to claim 1, wherein
the process comprises:
   determining for each application window of the plurality of applications windows which remote application server of the plurality of remote application servers is hosting the application window of the plurality of application windows;
   determining that a last remaining application window of the plurality of applications windows for a specific remote application server of the plurality of remote application servers has been closed;
   determining whether a user of the electronic device requests access to another application upon the specific remote application server of the plurality of remote application servers prior to expiration of a time period after the last remaining application window of the plurality of applications windows for the specific remote application server of the plurality of remote application servers was closed;
   upon a determination that the time period expired before the request for access to another application upon the specific remote application server of the plurality of remote application servers was made closing an existing communication session with the specific remote application server of the plurality of remote application servers;
   upon a determination that the time period had not expired before the request for access to another application upon the specific remote application server of the plurality of remote application servers was made the electronic device can use existing communication session to access the another application upon the specific remote application server of the plurality of remote application servers.

10. The method according to claim 9, wherein
the time period is configurable.

11. The method according to claim 9, wherein
the time period is defined by at least one of a user of the electronic device and an administrator of the specific remote application server of the plurality of remote application servers.

12. A non-transitory computer readable medium comprising computer executable instructions, the computer executable instructions when executed by a microprocessor of a user device cause the microprocessor to execute a process comprising:
rendering to a user of an electronic device a browser window of a browser application in execution upon the electronic device;
rendering to the user of the electronic device a plurality of application windows within the browser where each application window of the plurality of application windows is associated with an application in execution upon a remote application server of a plurality of remote application servers; and
executing a process upon the electronic device comprising:
determining an application window of the plurality of application windows within the browser is currently in focus;
capturing keyboard input established by the user via a keyboard interface of the electronic device;
determining that the keyboard input is special keyboard input in dependence upon interception data for the application window of the plurality of application windows currently in focus stored within a database; and
upon a positive determination that the keyboard input is special keyboard input executing a further process comprising the steps of:
blocking the special keyboard input from being provided to the browser application;
determining which remote application server of the plurality of remote application servers is hosting the application window of the plurality of application windows currently in focus;
transmitting a request comprising the special keyboard input to the remote application server of the plurality of remote application servers to perform an operation upon a remote application window of an application associated with the application window of the plurality of application windows currently in focus;
receiving from the remote application server of the plurality of remote application servers hosting the application window of the plurality of application windows currently in focus instructions for performing an operation upon the application window of the plurality of application windows currently in focus; and
performing the operation with the electronic device on the application window of the plurality of application windows currently in focus; wherein
performing the operation with the electronic device on the application window of the plurality of application windows currently in focus comprises updating a document object model (DOM) for a remote access client web page associated with the application window of the plurality of application windows currently in focus based upon data contained within the instructions;
the browser window automatically displays a result of the updated DOM; and
the browser windows is updated without a refresh of the remote access client web page.

13. The computer readable medium according to claim 12, wherein
the interception data specifies a plurality of keyboard inputs that should be intercepted and prevented from reaching the browser application.

14. The computer readable medium according to claim 12, wherein
the interception data specifies a plurality of keyboard inputs that should be intercepted and prevented from reaching the browser application;
the interception data is configurable by at least one of a user of the electronic device and a system administrator.

15. The computer readable medium according to claim 12, wherein
the interception data specifies a plurality of keyboard inputs that should be intercepted and prevented from reaching the browser application;
a subset of the interception data comprises one or more discrete keys or one or more combinations of two or more discrete keys where each discrete key is selected from the group comprising a function key, a key specific to an operating system of the electronic device, a Shift key, and an Alt key; and
another subset of the interception data comprises one or more keys or one or more key combinations of two or more keys where each key or key combination is configured by at least one of a user of the electronic device and a system administrator.

* * * * *